United States Patent
Yin

(10) Patent No.: US 11,012,759 B2
(45) Date of Patent: *May 18, 2021

(54) WEBCASTING METHOD, DEVICE AND STORAGE MEDIUM OF MEDIA FILE

(71) Applicant: Beijing Bytedance Network Technology Co., Ltd., Beijing (CN)

(72) Inventor: Guohui Yin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,013

(22) Filed: Sep. 15, 2020

(65) Prior Publication Data

US 2020/0413160 A1    Dec. 31, 2020

Related U.S. Application Data

(63) Continuation of application No. PCT/CN2018/103443, filed on Aug. 31, 2018.

(30) Foreign Application Priority Data

May 29, 2018   (CN) .......................... 201810531180.4

(51) Int. Cl.
*H04N 21/845* (2011.01)
*H04N 21/234* (2011.01)
(Continued)

(52) U.S. Cl.
CPC ....... *H04N 21/8456* (2013.01); *H04N 21/234* (2013.01); *H04N 21/4402* (2013.01); *H04N 21/85406* (2013.01)

(58) Field of Classification Search
None
See application file for complete search history.

(56) References Cited

U.S. PATENT DOCUMENTS

2011/0093617 A1*   4/2011   Igarashi .............. H04N 21/658
                                                            709/246
2013/0298171 A1*  11/2013   Takeda ................. G11B 27/034
                                                            725/74
(Continued)

FOREIGN PATENT DOCUMENTS

CN         107613029 A      1/2018
WO     WO 2017/207861 A1   12/2017

OTHER PUBLICATIONS

International Patent Application No. PCT/CN2018/103443; Int'l Search Report; dated Mar. 4, 2019; 3 pages.
(Continued)

*Primary Examiner* — Nasser M Goodarzi
*Assistant Examiner* — Terrika Peterson
(74) *Attorney, Agent, or Firm* — BakerHostetler

(57) ABSTRACT

A webcasting method of a media file is provided, including obtaining media data in the media file from a server by a player built-in a webpage, constructing fragmented media files containing the media data by the player, sending the fragmented media files to a media source extension interface by the player, and invoking a media element of the webpage by the media source extension interface for playing; the player plays the media file in the webpage, and the media file adopts a non-streaming media encapsulation format. A webcasting device and a storage medium of a media file are further provided.

17 Claims, 7 Drawing Sheets

(51) Int. Cl.
*H04N 21/4402* (2011.01)
*H04N 21/854* (2011.01)
*H04N 21/658* (2011.01)

(56) References Cited

U.S. PATENT DOCUMENTS

2014/0281035 A1* 9/2014 Harrison ............. H04L 65/4084
                                                  709/247
2017/0093939 A1   3/2017 Bar-Mashiah et al.
2018/0213294 A1*  7/2018 Lau ...................... H04L 65/608
2020/0413130 A1* 12/2020 Yin .................... H04N 21/4402

OTHER PUBLICATIONS

"WebSocket and MSE of HTML5 live broadcast protocol"; https://blog.csdn.net/dj0379/article/details/73696007; CSDN; Jun. 2017; accessed Sep. 16, 2020; 9 pages.

Alex Zambelli; "Smooth Streaming Architecture"; https://alexzambelli.com/blog/2009/02/10/smooth-streaming-architecture/; Feb. 2009;. accessed Sep. 16, 2020; 6 pages.

"ISO BMFF Byte Stream Format"; https://www.w3.org/2013/12/byte-stream-format-registry/isobmff-byte-stream-format.html; W3C; Jul. 2014; accessed Sep. 16, 2020; 4 pages.

* cited by examiner

WEBCASTING METHOD, DEVICE AND STORAGE MEDIUM OF MEDIA FILE

CROSS-REFERENCE TO RELATED APPLICATION

The disclosure is a continuation of PCT application Ser. No. PCT/CN2018/103443, filed on Aug. 31, 2018, which claims the priority benefit of CN application Ser. No. 201810531180.4, filed on May 29, 2018. The entirety of the above-mentioned patent application is hereby incorporated by reference herein and made a part of this specification.

TECHNICAL FIELD

The disclosure relates to a webcasting technology, and more particularly to a webcasting method, device and storage medium of a media file.

DESCRIPTION OF RELATED ART

A player embedded in a webpage plays a media file in a webpage by using a HyperText Markup Language (HTML) 5 media element of the webpage; however, the relevant art can only support a streaming media file (e.g., HTTP Live Streaming (HLS)), and media files in a non-streaming media encapsulation format (e.g., Moving Picture Experts Group (MPEG)-4 files) in the network do not support the webcasting of streaming media files; therefore, when a player plays a media file in a non-streaming media encapsulation format over a webpage, the format of the media file needs to be converted, and a store service and a content delivery network (CDN) should be deployed. As a result, the real-time cost of playing the media file and the load of the network system architecture will rise.

SUMMARY

Accordingly, embodiments of the disclosure provide a webcasting method, device and storage medium of a media file capable of reducing the real-time cost of the webcasting file and lightening the load on the network system architecture.

On one hand, an embodiment of the disclosure provides a webcasting method of a media file, including obtaining media data in the media file from a server by a player built-in a webpage; constructing fragmented media files comprising the media data by the player; and sending the fragmented media files to a media source extension interface by the player, and invoking a media element of the webpage by the media source extension interface for playing.

The player plays the media file in the webpage, and the media file adopts a non-streaming media encapsulation format.

On the other hand, an embodiment of the disclosure provides a webcasting method of a media file, disposed in a player built-in a webpage, including an obtainer disposed to obtain media data in a media file from a server, a constructor disposed to construct fragmented media files containing the media data by the player, and a player disposed to send the fragmented media files to a media source extension interface by the player and invoke a media element of the webpage by the media source extension interface for playing.

The player plays the media file in the webpage, and the media file adopts a non-streaming media encapsulation format.

Furthermore, an embodiment of the disclosure further provides a webcasting device of a media file, including a memory disposed to store an executable instruction, and a processor disposed to follow the executable instruction stored in the memory to implement the aforementioned webcasting method of a media file.

Moreover, an embodiment of the disclosure further provides a storage medium, storing an executable instruction; when the executable instruction is performed, the webcasting method of a media file can be implemented.

Application of the embodiments of the present disclosure renders the following technical effects:

1) Media files in a non-streaming media packaging format are converted into fragmented media files by a front-end player, storage services and CDNs deployment are no more necessary, the real-time cost of playing the media files in the non-streaming media packaging format and the load of a network system architecture are reduced.

2) By converting media data in a media file in a non-streaming media format into a fragmented media file and sending the fragmented media file to a media element of a web page for decoding and playing through a media source expansion interface of the web page, the object of playing the media file in the non-streaming media format through the web page by the embedded player is achieved, overcoming the limitation that the non-streaming media packaged format file can only be independently played after being completely downloaded.

3) The packaged fragmented media file is on the basis of partial media data of the acquired media file instead of all the data of the media file, so that the conversion delay is minimized, pre-storage is no more necessary, no extra storage space is occupied except by the original media file, and thus the occupation of the storage space is remarkably reduced.

4) The media element of the web page acquires the fragmented media file on the basis of the virtual address to decode and play, instead of acquiring the media data on the basis of the real address of the media file to play, thereby realizing the protection of the real address of the media file.

DETAILED DESCRIPTION OF PREFERRED EMBODIMENTS

In order to better clarify the objective, contents and advantages of the disclosure, the disclosure will be further illustrated in detail with reference to drawings therewith. The described embodiments should not be regarded as restriction to the disclosure. All the other embodiments obtained by a person skilled in the art without creativity should be included in the protective scope of the disclosure.

Unless otherwise specified, all technical and scientific terms employed in the disclosure represent the same meaning as those accepted by a person skilled in the art. The terms therein are purely for a purpose of depicting concrete embodiments rather than limiting the disclosure.

Before further expressing the disclosure, substantives and technical terms in embodiments of the disclosure will be explained. The substantives and technical terms in the embodiments of the disclosure refer to following definitions.

(1) A media file indicates a file stores encoded media data such as at least one of audio data and video data in a manner of boxes, which likewise contains moov (aka. metadata) expressing the media information to ensure media data to be decoded correctly.

For instance, a file encapsulating multimedia data by an MP4 box format is an MP4 file. Typically, the MP4 file stores advanced video coding (AVC), namely H.264, or video data encoded by the MPEG-4 (part 2) standard and audio data encoded by the advanced audio coding (AAC) standard. There is no doubt that other encoding modes of video and audio will not be excluded.

Figure 1:
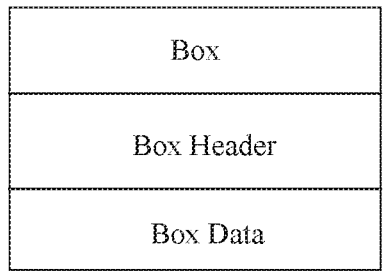
FIG. 1 is an optional structural schematic view of a box provided by an embodiment of the disclosure.

(2) A box is a component of an object oriented defined by a sole type identifier and length, referring to FIG. 1, which is an optional structural schematic view of a box provided by an embodiment of the disclosure, including a box header and box data, and binary data conveying various information filled therein.

Figure 2:
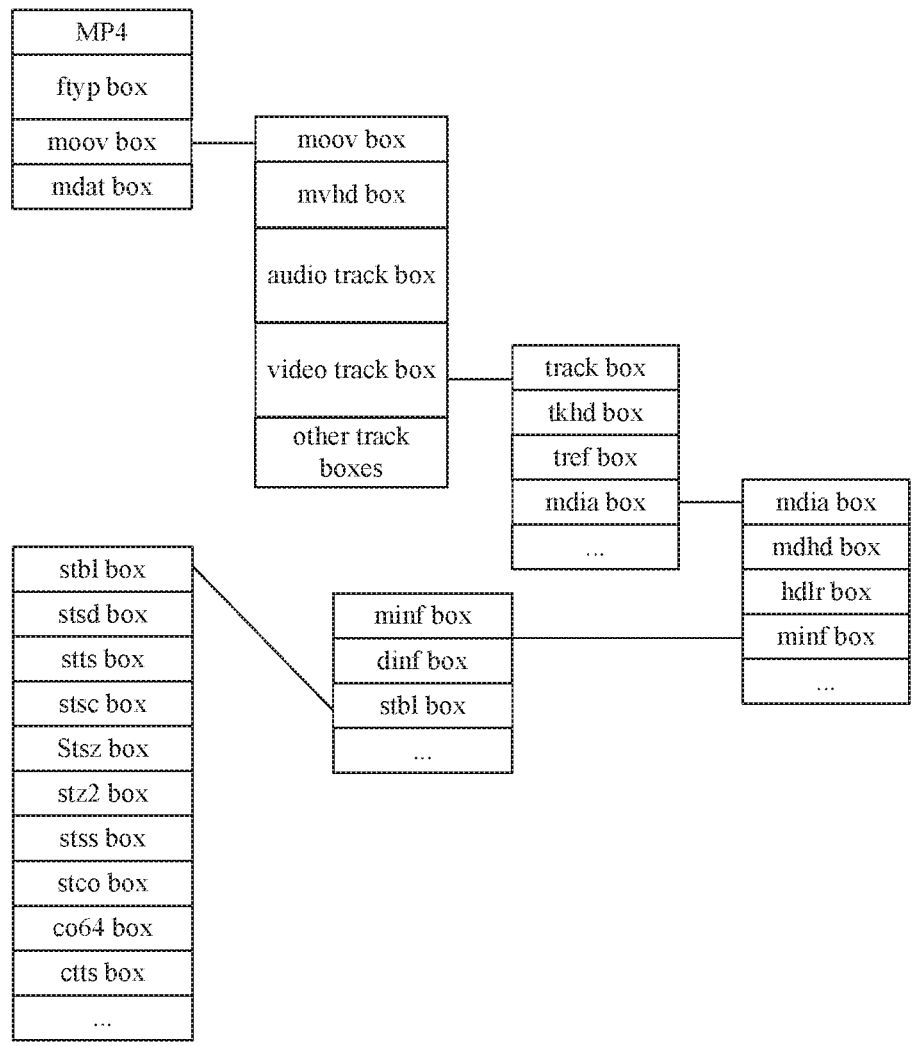
FIG. 2 is an optional schematic view of an encapsulation structure of an MP4 file provided by an embodiment of the disclosure.

The box header includes size and type. The size specifies the volume of the length storage space of the box occupied in the media file. The type specifies the type of the box. Referring to FIG. 2, which is an optional schematic view of an encapsulation structure of an MP4 file in an embodiment of the disclosure. Fundamental types of boxes involved in the MP4 file contain an flyp box, an moov box and an mdat box.

The box data section can store specific data, and the box is called a data box. The box data section can further encapsulate other types of boxes, and the boxes can be containers of boxes.

(3) A track is a relevant sample arranged in chronological order in the mdat box. Regarding the media data, the track signifies a video frame sequence or an audio frame sequence, further incorporating a subtitle track synchronized with the video frame sequence. A contiguous set of samples in one track are chunks.

(4) An ftyp box is a box for storing the size, namely a length of occupied bytes, and the type of the file in the media file. As shown in FIG. 2, the binary data stored in the flyp box describe the type and the compatibility of the file box according to the standard byte length.

(5) An moov box is a box storing moov that is data to depict multimedia data in the mdat box in the media file. Information recorded as binary data stored in the moov box in the MP4 file is called media information.

As shown in FIG. 2, a type of the box of the header of the moov box recorded as binary data is the moov box. The box data division encapsulates an mvhd box storing total information of the MP4 file, which is independent from the MP4 file, and relative to properties of the MP4 file, including duration, creation time and modification time, etc.

The mdat box of the media file can contain sub-boxes corresponding to multi-tracks, such as an audio track box and a video track box. The sub-boxes of the audio track box and the video track box include quotation and description of the media data of corresponding tracks. Necessary sub-boxes include a box describing characteristics and total information such as duration, width and height, which is labelled as a tkhd box, and a box recording media information of tracks such as media types and sampling information, which is labeled as an mdia box.

The sub-boxes encapsulated in the mdia box can include the a box recording relevant properties and contents of tracks, which is labeled as an mdhd box, a box recording playing procedure information of media, which is labeled as an hdlr box, a box describing the media information of media data in tracks, which is labeled as an minf box; the minf box further encapsulates a sub-box to interpret how to locate media information, which is labeled as a dinf box, and a sub-box for recording all the time information such as decoding time and displaying time, location information and encoding/decoding information of samples in tracks, which is labeled as an stbl box.

Figure 3:
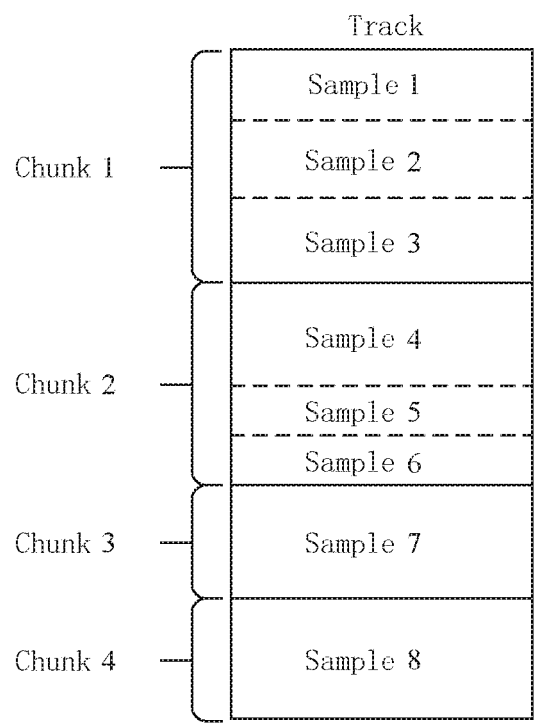
FIG. 3 is a structural schematic view of an mdat box storing media data in a media file provided by an embodiment of the disclosure.

Referring to FIG. 3, which is a structural schematic view of an mdat box storing media data in a media file provided by an embodiment of the disclosure. The time, type, size and location in the mdat box of samples can be explained by media information recognized from binary data in the stbl box. Each of the sub-boxes in the stbl box will be illustrated as follows.

The stsd box includes a sample description table. According to different encoding schemes and quantities of files storing data, each media file can have one or more description table(s). The description information of each sample can be found through searching the description table. The description information can guarantee correctness in decoding samples. Each media type stores corresponding description information. For instance, with respect to a video medium, the description information is a structure of an image.

The stts box stores duration information of samples, as well as providing a table for mapping time such as decoding time and the sequence number of a sample. A sample at any time of the media file can be located by the stts box; the stts box further uses other tables to map the size and pointer of a sample. Each entry offers sequence numbers of successive samples in an identical time offset and the offset of samples. An intact mapping table of time-sample can be established by progressively increasing the offsets. A computational formula is as follows.

$$DT(n+1)=DT(n)+STTS(n) \qquad (1)$$

Where STTS(n) is the duration of the nth sample; DT(n) is the display time of the nth sample. An order of the samples is in accordance with the time sequence; therefore, the offset will always be nonnegative. Generally, DT beginning from 0, and taking the display time of an $i^{th}$ sample as an example, the computational formula is as follows.

$$DT(i)=\text{SUM (for } j=0 \text{ to } i-1 \text{ of delta}(j)) \qquad (2)$$

The sum of all offsets is the duration of the media data in tracks.

A stss box records sequence numbers of key frames in the media file.

A stsc box records a mapping relation between samples and chunks storing the samples. The table maps the relation between the sequence numbers of samples and those of chunks. The chunk containing a specific sample can be determined by searching the table.

A stco box defines the location of each chunk in tracks. The location is represented by the offset of an initial byte of the mdat box and a length corresponding to the initial byte, namely a size.

A stsz box records a volume/size of each sample in the media file.

(6) An mdat box is a box for storing multimedia data in the media file. For instance, an mdat box in an MP4 file, as shown in FIG. 3, a sample is a unit stored in the mdat box. In a chunk stored in the media file, lengths of chunks and those of samples can mutually be different.

(7) A fragmented media file is a sub-file formed by dividing the media file. Each fragmented media file can be decoded independently.

Taking the MP4 file as an example, the media data in the MP4 file is divided according to the key frames. The divided media data and corresponding moov are encapsulated to form a fragmented MP4 (FMP4) file. The moov in each FMP4 file can ensure the media data to be decoded correctly.

Figure 4:
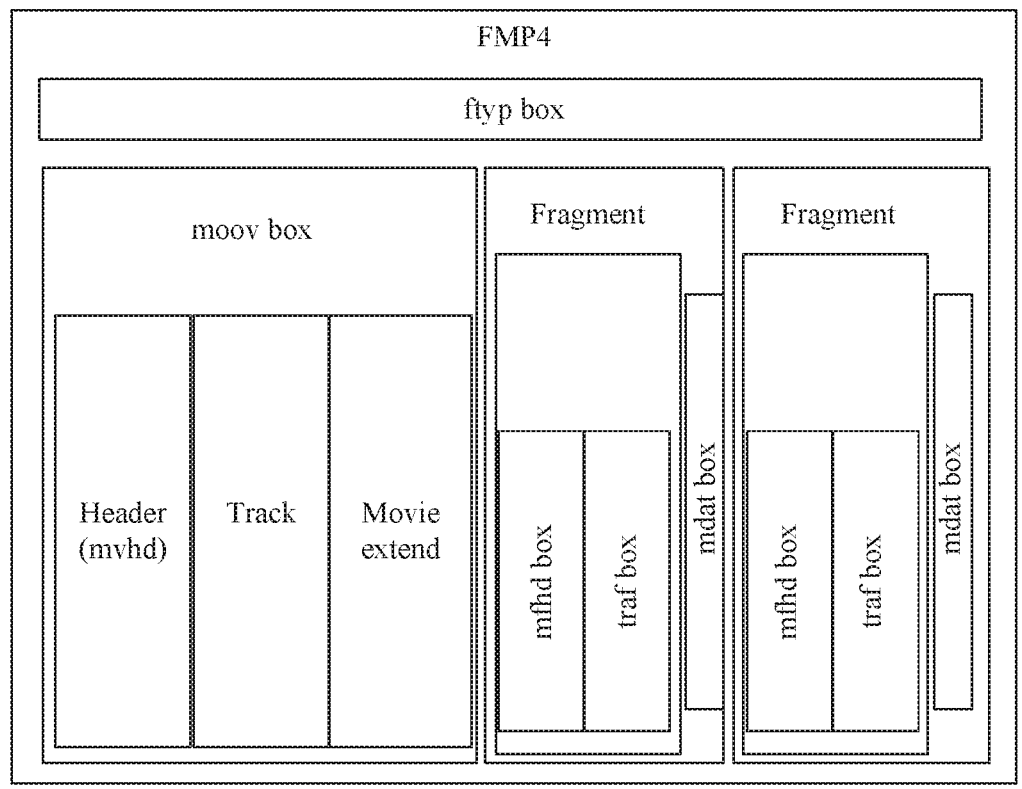
FIG. 4 is an optional schematic view of an encapsulation structure of an FMP4 file provided by an embodiment of the disclosure.

For instance, when the MP4 file as shown in FIG. 2 is converted to multiple FMP4 files, referring to FIG. 4, which is an optional schematic view of an encapsulation structure of an FMP4 file provided by an embodiment of the disclosure. One MP4 file can be converted to be multiple FMP4 files. Each FMP4 file includes three basic boxes: an moov box, an moof box and an mdat box.

The moov box includes the MP4-leveled moov, which is used for describing all media data of the MP4 file that the FMP4 files derived from, such as the duration, creation time and modification time of the MP4 file.

An moof box stores the fragmented moov, which describes media data encapsulated in the FMP4 file therein to ensure the media data in the FMP4 file to be able to be decoded.

One moof box and one mdat box constitutes one fragment of the fragmented MP4 file. One fragmented MP4 file can include one or more fragment(s). The moov encapsulated in each fragment guarantees media data encapsulated in fragments to be decoded independently.

(8) A media source extensions (MSE) interface is an interface orienting players embedded in the network, which is interpreted by an interpreter during loading a webpage and achieved by running the frontend programming language such as JavaScript, with a function of providing playing media stream of the media element invoking Hyper Text Markup Language (HTML) to players, such as utilizing the video element and the audio element to perform functions of the video/audio.

(9) A streaming media encapsulation format streaming media format is a media file encapsulating media data to be streaming media. The media file is unnecessary to be completely downloaded or additionally transcoded for being decoded and played. In other words, the encapsulation technology originally supports downing and playing at the same time. A typical file of the streaming media encapsulation format streaming media format can be such as a TS media file fragmentation based on the HTTP Live Streaming (HLS) technique, flash video (FLV) and so on.

(10) A non-streaming media encapsulation format streaming media format is an encapsulation technology of decoding and playing after encapsulating media data to be a media file and completely downing the media file. A typical file of the non-streaming media encapsulation format streaming media format includes an MP4 file, a windows media video (WMV) file, an advanced streaming format (ASF) file and so on.

It is necessary to point out that the MP4 file originally fails to play in a form of streaming media, but the technical effect of downing and playing at the same time can be acquired by online transcoding and subsequently delivering the transcoded streaming media to the player, or filling invalid binary data into the blank section of the incompletely downloaded MP4 file such as filling a blank section of an mdat box with invalid binary data when an flyp box and an moov box are entirely downloaded. In the disclosure, encapsulation formats reject files of playing streaming media originally are defined to be non-streaming media formats.

The procedure that the player obtains media data within a given period of an embodiment of the disclosure will be illustrated as follows.

When the player plays a movie or a track, it is required for the player to analyze the data stream correctly. After some time, corresponding media data can be obtained, and the media data should be decoded independently.

1. The period corresponding to the obtained media data is determined. The period is a period of time to continuously play from the current playing point. The time corresponding to the playing point is a time scale with respect to a media time coordinated system with the start playing time of the media file as a time origin.

2. Serial numbers of samples within a given period of time corresponding to the decoding time are determined by checking the stts box.

Regarding audio frames, serial numbers of audio frames within a given period of time corresponding to the decoding time are determined by checking the stts box.

Regarding video frames, as the compression algorithm is employed, if the first frame within the given period of time is not a key frame, a key frame before the starting time of the given period of time needs to be obtained according to the time sequence to ensure frames within the given period of time to be decoded.

3. Serial numbers of sampled chunks are determined by searching the stsc box according to the employed serial numbers.

4. The offset of chunks is determined by searching the stco box.

5. The stsz box is searched according to the serial numbers of samples to obtain the offset of the samples in the chunks and sizes of samples.

The procedure of searching key frames of embodiments of the disclosure will be continuously illustrated.

1. Serial numbers of samples within a given period of time are determined.

2. A key frame after the sample is determined by checking the stss box.

3. Chunks corresponding to the key frame are obtained by checking the stsc box.

4. The offset of chunks is extracted from the stco box.

5. The offset of the key frame sample in chunks and the size of the key frame are obtained by the stsz box.

The webcasting control device of the media file of the embodiment of the disclosure will be first illustrated. The webcasting control device of the media file detects the window configured for playing the media file of the player; responding to the real-time playing point of the playing schedule of the media file, marks of fragmented media files not being played are shown in the window; the media file corresponds to multiple fragmented media files; responding to the selected marks of the fragmented media files, the player pre-loads the corresponding fragmented media file.

First, a load control device of a media player of an embodiment of the disclosure will be introduced. The load control device of the media player provided by the embodiment of the disclosure can be various sorts of subscriber terminals such as a smart phone, a tablet, a laptop and so on. Exemplary applications of the device acting as the subscriber terminal will be illustrated as follows.

Figure 5:
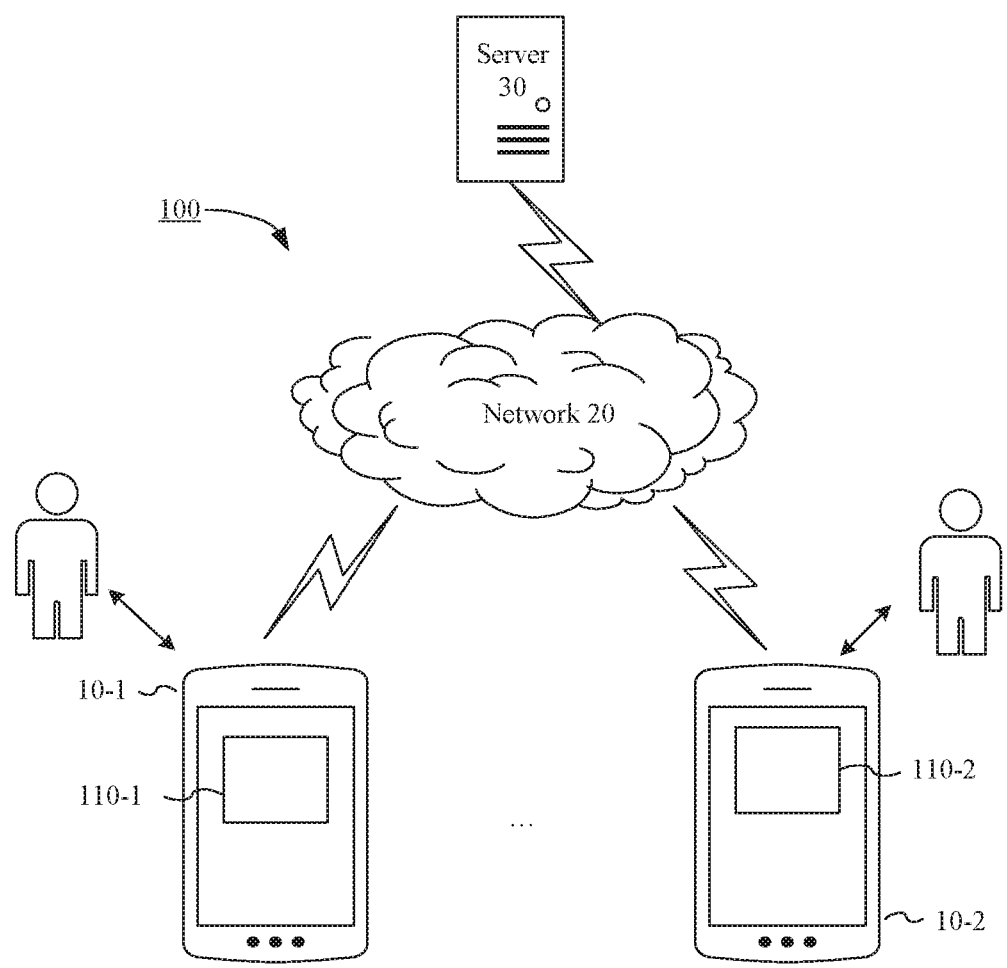
FIG. 5 is a schematic view of a framework of a webcasting system of a media file provided by an embodiment of the disclosure.

Referring to FIG. 5, FIG. 5 is a schematic view of a framework of a webcasting system of a media file provided by an embodiment of the disclosure. In order to provide an exemplary application, a subscriber terminal 10 (exemplarily showing a subscriber terminal 10-1 and another subscriber terminal 10-2) is connected to a server 30 over a network 20. The network 20 can be a wide area network or a local area network, or a combination of both, which transmits data over a wireless link.

The subscriber terminal 10 plays a media file by a player built in a webpage, and shows contents through a graphical interface 110 (exemplarily showing a graphical interface 110-1 and another graphical interface 110-2). During the broadcast, the subscriber terminal 10 analyzes the moov encapsulated in the moov box of the media file by the player built-in the webpage to obtain media information of media data encapsulated in the mdat box of the media file. The server employs the non-streaming media format; according to the time and position of the media data represented by the media information, a portion of the media data in the mdat box of the media file are obtained from the server 30; the obtained portion of media data and the moov describing the portion of media data are encapsulated according to the box structure of the fragmented media files to obtain corresponding fragmented media files; the fragmented media files are sent to the media element of the webpage through the media source extension interface of the webpage for decoding and playing.

The structure of the webcasting control device of the media file of the embodiment of the disclosure will be successively illustrated.

Figure 6:
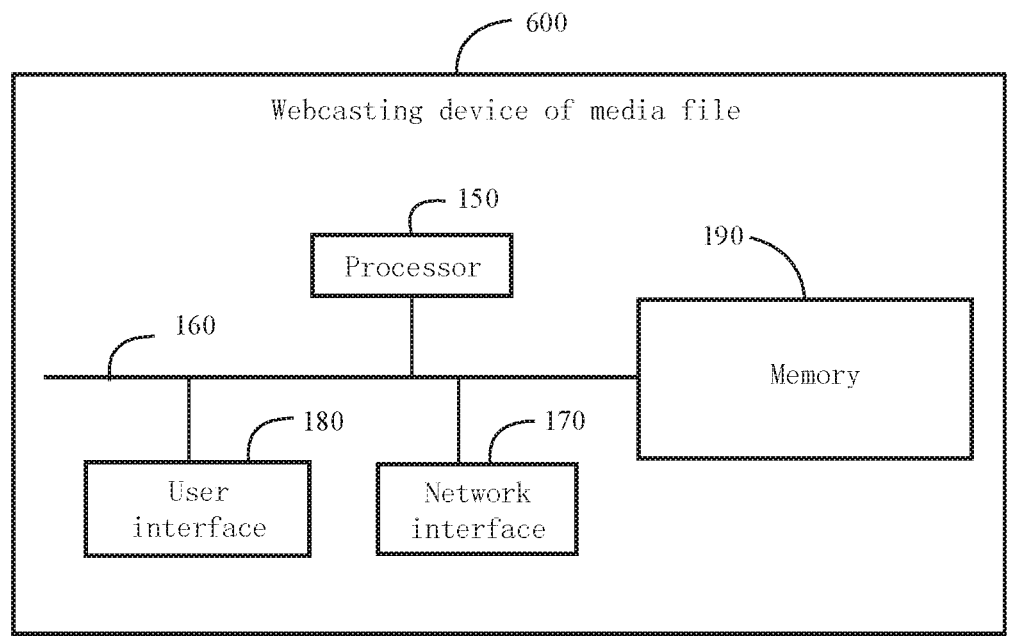
FIG. 6 is an optional structural schematic view of a webcasting control device of a media file provided by an embodiment of the disclosure.

Referring to FIG. 6, which is an optional structural schematic view of a webcasting device 600 of the media file provided by the embodiment of the disclosure. The webcasting control device of the media file as shown in FIG. 6 includes at least one processor 150, at least one bus system 160, a user interface 180, at least one network interface 170 and a memory 190. Various components in the webcasting control device 600 of the media file are coupled together by the bus system 160. Conceivably, the bus system 160 is utilized to connect and communicate the components. Besides the data bus, the bus system 160 further includes a power bus, a control bus and a status signal bus. But for the sake of clear illustration, all sorts of buses in FIG. 6 are marked as the bus system 160.

The user interface 180 can include a display, a keyboard, a mouse, a trackball, a click wheel, a key, a button, a touch panel or a touch screen. The network interface 170 can include a standard wired interface, a wireless interface such as a WiFi interface.

Conceivably, the memory 190 can be a high-speed RAM memory or a nonvolatile memory, such as at least one disk memory. The memory 190 can further be at least one memory system far away from the processor 150 in physical location.

The webcasting control method of the media file of the webcasting control device applied in the media file provided by the embodiment of the disclosure can be used in the processor 150, or fulfilled by the processor 150. The processor 150 can be an integrated circuit chip with abilities to process signals. During the process, different operations in the webcasting control method of the media file applied in the webcasting control device of the media file can be fulfilled by an integrated logic circuit of in the form of hardware or commands in the form of software in the processor 150. The aforementioned processor 150 can be a communication processor, a DSP or other programmable logic devices, a discrete gate, a transistor logic device, or a discrete hardware component, etc. The processor 150 can implement or perform the methods, steps and logic diagrams of the webcasting control of the media file applied in the webcasting control device of the media file in the embodiment of the disclosure. The communication processor can be a microprocessor or any other conventional processor. Combined with the webcasting control method of the media file applied in the webcasting control device of the media file provided of embodiments of the disclosure, the result can be processed by hardware decoding processors or mixture of hardware and software in decoding processors.

Figure 7:
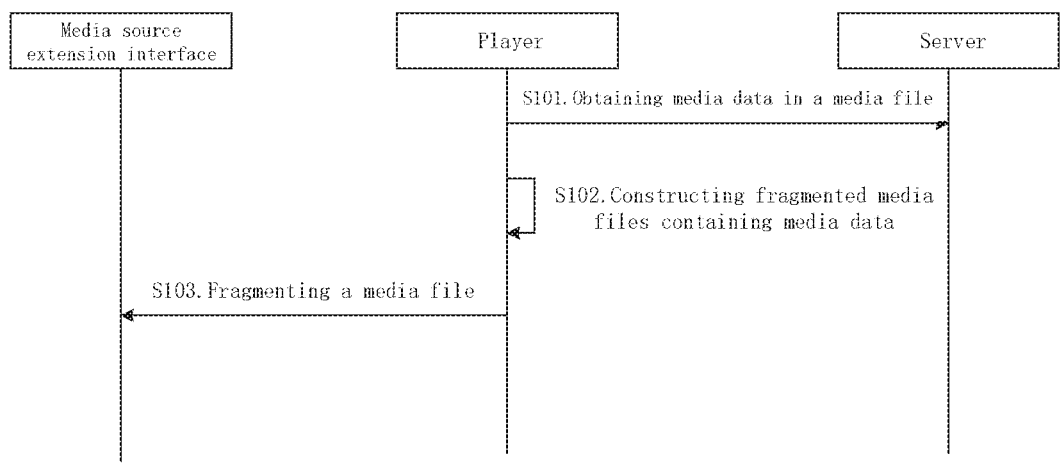
FIG. 7 is an optional schematic view of a procedure of a webcasting method of a media file provided by an embodiment of the disclosure.

As an example, software modules can be located in a storage medium. The storage medium can be the memory 190 shown in FIG. 6. The processor 150 reads executable commands in the memory 190 to accomplish an optional process of the webcasting control method of the media file applied in the webcasting control device of the media file provided by the embodiment of the disclosure combined with the hardware thereof as shown in FIG. 7, including following steps.

Step S101, media data in a media file are acquired from a server by a player embedded in a webpage.

In an embodiment of the disclosure, the webpage may be a webpage of a browser, or a webpage of an APP embedded with a browser kernel. The player may be an H5 player embedded in a webpage or a dedicated video play application (APP).

Figure 8:
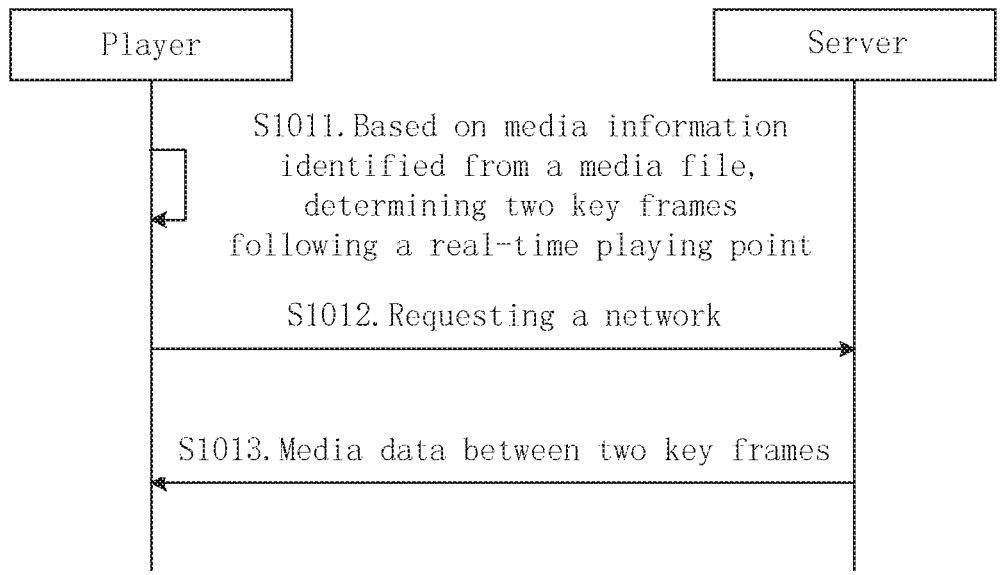
FIG. 8 is an optional schematic view of a procedure of media data in an obtained media file in an embodiment of the disclosure.

In some embodiments, an optional process flow for acquiring media data in a media file is shown in FIG. 8, including the following steps.

Step S1011, the player determines two key frames of a continuous real-time play point in the media file based on media information identified from the media file.

In some embodiments, the two key frames include a first key frame and a second key frame, and the first key frame and the second key frame may be determined on the basis of a particular time granularity, such as a difference between a decoding time of the first key frame and a decoding time of the second key frame conforming to the time granularity; the first key frame and the second key frame may also be determined on the basis of a content unit, for example, the content represented by the first key frame and the second key frame conforms to the same subject, such as the same character, scene, location, plot unit, etc. In addition, the first key frame and the second key frame can be two adjacent key frames, and other key frames can also exist between the first key frame and the second key frame, namely the second key frame is not a first key frame that follows the first key frame; when other key frames exist between the first key frame and the second key frame, the number of the key frames between the first key frame and the second key frame is determined according to the caching performance, the network performance and the like of the web page; the caching performance, of the web page, such as the available caching capacity, is positively related to the number of key frames between the first key frame and the second key frame; and the network performance, such as network bandwidth, is positively related to the number of key frames between the first key frame and the second key frame.

Step S1012, the player sends a network request to the server.

Herein, the network request is used to acquire media data between the two key frames in the media file.

With regard to the play point with which the two key frames are in succession, the play point be selected as a moment during playing that can be reached by continuously playing the media file (i.e., without user intervention), for example, from 00:30:00 to 00:40:00; it is also possible to reach a play point by means of jumping (i.e., the user clicks a progress bar to jump), for example, form the original play point at 20% to a play point at 30% of the playing progress.

In some embodiments, the method by which the two key frames (set as the first key frame, and the second key frame after the first key frame at the decoding time) are determined is described with respect to the cases where the play point is reached by playing the media file continuously and whether the video frame corresponding to the play point and the video frame corresponding to the end time of the given time period are common frames or key frames.

Case 1): if the video frame corresponding to the play point is a common frame, and since the player takes the media data between two key frames as a basic play loading unit, the media data after the play point and before the first key frame that follows the play point (the key frame closest to the play point in the key frames that are decoded later than the play point) is loaded media data; in order to avoid acquiring the loaded media data repeatedly, the first key frame of the two key frames of a given time period is the first key frame decoded after the play point in the media file.

Case 2): if the video frame corresponding to the play point is a key frame, the first key frame of the two key frames in a given time period is the key frame corresponding to the play point, namely, the key frame aligned with the start time of the given time period.

Case 3): if the video frame corresponding to the end time of the given time period is a common frame, and since the player takes the media data between two key frames as a basic playing loading unit, the media data between the key frame and the video frame corresponding to the end time are left out if the key frame before the end time is taken as the second key frame of the given time period, and then the media data between the key frame before the end time and the video frame corresponding to the end time cannot be played and the frames are skipped during playing of the media file; therefore, in order to ensure that the video frames corresponding to the end time of the given time period can be normally played without frame skipping, the second key frame in the two key frames of the given time period is the key frame decoded later than and closest to the end time of the given time period.

Case 4): if the video frame corresponding to the end time of the given period is a key frame, the second key frame of the two key frames of the given period is the second key frame having the decoding time aligned with the end time of the given period, i.e., the key frame aligned with the end time of the given period.

In the above cases 1) and 3), taking the key frame spanning over the play point as the end point of the media data of the given time period can ensure that the video frame corresponding to the play point has sufficient information for correct decoding, and frame skipping due to the lack of data to be decoded (i.e., the key frame) is avoided.

In the above-mentioned cases 2) and 4), in the case that the play point aligns the key frames, the aligned key frame is directly taken as the end point of the media data in the given time period, the redundant request for data is reduced to the minimum extent, and the situation that the network playing service of the non-media files in the web page is delayed due to the occupation of connection and traffic is avoided.

In another embodiment, the method by which the two key frames (set as the first key frame, and the second key frame decoded after the first key frame) are determined is described with respect to the cases where the play point is reached by jumping and whether the video frame corresponding to the play point and the video frame corresponding to the end time of the given time period are common frames or key frames.

Case 1): if the video frame corresponding to the play point is a common frame, and since the play point is reached by jumping, the media data between the first key frame before the play point and the play point is not loaded, and the first key frame is the first key frame decoded before the play point in the media file, namely a key frame having a decoding time, searched from the time of the media data (i.e., the corresponding relationship between the serial number represented by the media information and the decoding time of the frame), earlier than and closest to the start time of the given time period in the media file.

Additionally requesting the media data between the play point and the key frame before the play point can ensure normal decoding no matter which a play point is reached by jumping, so that frame skipping due to failure in decoding when the play point corresponds to a common frame is avoided.

Case 2): if the video frame corresponding to the play point is a key frame, the first key frame is a key frame corresponding to the play point, namely, the key frame having a decoding time, searched from the time of the media data (i.e., the corresponding relationship between the serial number represented by the media information and the decoding time of the frame), aligned with the start time of the given period of time.

Case 3): if the video frame corresponding to the end time of the given period is a common frame, the second key frame is a key frame having the decoding time later than and closest to the end time of the given period.

In the above cases 1) and 3), taking the key frame spanning over the play point as the end point of the media data of the given time period can ensure that the video frame corresponding to the play point has sufficient information for correct decoding, and frame skipping due to the lack of data to be decoded (i.e., the key frame) is avoided.

Case 4): if the video frame corresponding to the end time of the given period is a key frame, the second key frame is a key frame having the decoding time aligned with the end time of the given period.

In cases 2) and 4), by defining the media data to be acquired by the key frame aligned with the play point, on the premise that the play point can be decoded correctly, acquisition of unnecessary media data is reduced to the minimum extent, the occupation of connection and traffic is reduced, and the real-time performance of the network playing service of non-media files in the web page is further guaranteed.

In some embodiments, the player may search an audio frame aligned with the given time period from the time of the media data by: searching audio frames with decoding time distributed according to the given time period from the time of the media data, and positioning the audio frame in synchronization with a video frame by taking the video frame as a reference; if the time of the play point corresponds to an audio frame, the decoding time of the first audio frame is aligned with the start time of the given time period; if the time of the play point corresponds to no audio frame, the decoding time of the first audio frame is earlier than and closest to the start time of the given time period, and the decoding time of the first audio frame is ensured not to be later than the decoding start time of the first video frame (the above-mentioned first key frame); if the end time of the given time period corresponds to an audio frame, the decoding time of the last audio frame is aligned with the end time of the given time period; if the end time of the given period corresponds to no audio frame, the decoding time of the last audio frame is later than and closest to the end time of the given period, and the decoding time of the last audio frame is ensured not to be earlier than the decoding time of the last video frame (the above-mentioned second key frame). As such, the problem that the video and audio durations in the media files are inconsistent can be solved, synchronous playing of the audio and video is guaranteed, and pictures with no sound will not happen.

In some embodiments, the player may acquire media data at a corresponding position in a media data container of a media file by: determining, by the player, an interval formed by the minimum offset and the maximum capacity according to the offset and the capacity corresponding to the position of the video frame between the two key frames in the given time period and the offset and the capacity corresponding to the position of the audio frame aligned with the video frame between the two key frames; and acquiring media data in a corresponding interval of a media data container of the media file.

Determination of the interval formed by the minimum offset and the maximum capacity is described herein, a video frame is positioned in the metadata container according to the offset and the capacity of the video frame between the first key frame and the second key frame in the two key frames in the media file, an audio frame is positioned in the metadata container according to the offset and the capacity of the audio frame aligned with the video frame in the media file, an interval formed by an upper limit and a lower limit of the position, namely, the interval formed by the minimum offset and the maximum capacity, is taken as a target interval; wherein the offset and the capacity corresponding to the upper limit of the position are the offset and the capacity corresponding to the upper limit of the target interval, and the offset and the capacity corresponding to the lower limit of the position are the offset and the capacity corresponding to the lower limit of the target interval.

In practical application, the target interval is the smallest interval in which video frames and audio frames are stored in the media data container of the target resolution media file, for example: the offset of the position of the video frame between the first key frame and the second key frame in the target resolution media file corresponds to an interval [a, b] (the address is in an ascending order), the offset of the position of the audio frame in the target resolution media file corresponds to an interval [c, d] (the address is in an ascending order), and then the interval formed by the upper limit and the lower limit of the position is [min (a, c), max (b, d)].

Note that when media data between the two key frames are cached in a web page, the extracted media data between the two key frames from the media file are ignored.

Therefore, the player sends a network request carrying the offset and the capacity of the target interval to the server so as to request the media data of the target interval, and the server extracts the media data in the media file according to the offset and the capacity of the target interval and returns the media data of the target interval for once without secondary acquisition, thereby reducing the requests of the player, and improving the processing efficiency.

Step S1013, the player receives the media data between the two key frames returned from the server.

Figure 9:
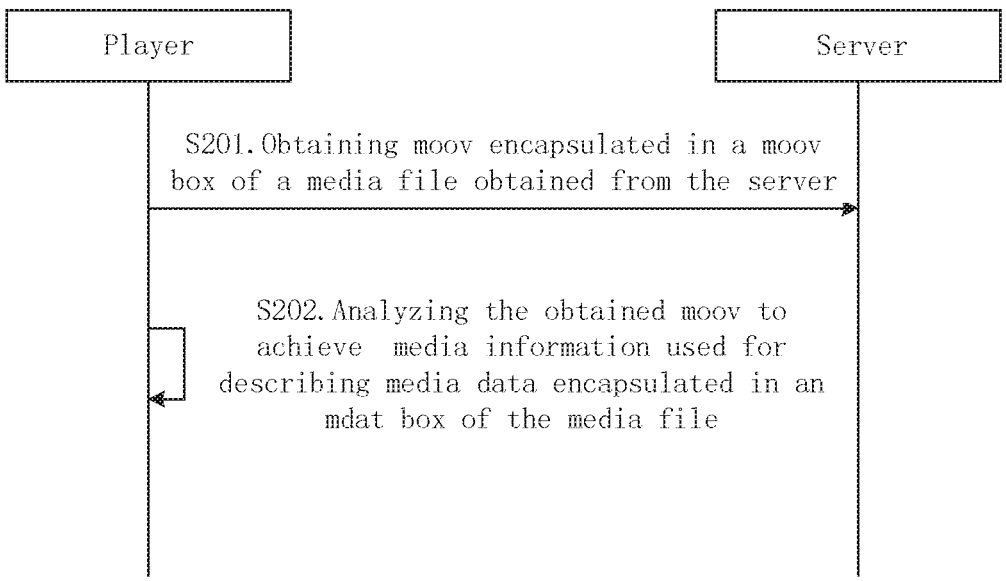
FIG. 9 is an optional schematic view of a procedure of identifying media information from a media file in an embodiment of the disclosure.

In some embodiments, before the player acquires media data in the media file from the server, the player also identifies media information from the media file, as shown in FIG. 9, including following steps.

Step S201, the moov (metadata) encapsulated in the moov box of the media file is obtained from the server through the player embedded in the webpage.

Herein, the player embedded in the web page plays the media file in the web page, and the media file adopts a non-streaming media format such as an MP4/MKV/WMV/ASF packaging format.

In some embodiments, the player may acquire metadata packaged in a metadata container of a media file by: sending a network request carrying set offset and capacity to a server by the player so as to acquire binary data starting from zero bytes and conforming to the set capacity in a media file returned by the server; the metadata in the metadata container is identified from the binary data returned by the server.

The set capacity can be acquired by statistics according to the capacity of the file type container and the metadata container of the existing media file, so that the set capacity can cover the sum of the capacities of the file type container and the metadata container of a set proportion (e.g., all) of the media file, which ensures that when the packaging structure of the media file is sequentially packaged file type container, metadata container and media data container, the metadata packaged in the complete metadata container can be acquired through a request for once, so that the occupation of the connection during network transmission is reduced, and the response delay due to the fact that little enough connection can be spared for non-media file network playing services in the web page in addition to the occupation is avoided.

Taking an MP4 file as an example of the media file, the metadata packaged in the metadata container acquired by the player is the binary data packaged in the moov box in the MP4 file, and when the packaging structure of the MP4 file is sequentially packaged fytp box, moov box and mdat box, the set capacity can be acquired by statistics according to the capacities of the flyp box and moov box of the existing MP4 file, such that the set capacity can cover the sum of the binary data of the flyp box and the moov box of a set proportion (e.g. all) of the MP4 file, which ensures that the complete binary data included in the moov box can be acquired from the server through a request for once in most cases.

In some embodiments, in the binary data requested by the player from the server according to the set offset and capacity, the section of the binary data starting from zero bytes corresponds to the file type container, the player acquires the capacity of the file type container by reading the header of the container, and acquires the type and the capacity of the next container by reading the header of the second container, and a case where the type of the second container is a metadata container and the capacity of the returned binary data is not less than the sum of the capacity of the file type container and the capacity of the metadata container indicates that the binary data requested from the server according to the set offset and capacity includes the metadata packaged in the metadata container; while a case where the type of the second container is a metadata container and the capacity of the returned binary data is less than the sum of the capacity of the file type container and the capacity of the metadata container indicates that the binary data requested from the server according to the set offset and capacity does not includes the metadata packaged in the metadata container. In the case that the binary data requested by the player from the server according to the set offset and capacity does not include the complete metadata in the metadata container, the player needs to read the capacity of the container from the binary data returned by the server, calculate the offset and the capacity of the metadata container according to the header of the metadata container, and send a network request with the calculated offset and capacity carried to request the metadata from the server; the server reads binary data from the offset calculated in the media file according to the request, and returns the data to the player when the read binary data conforms to the calculated capacity.

As an example, the player reads the capacity of the container from the binary data returned by the server, and calculates the offset and the capacity of the metadata container according to the header of the metadata container, including the following two cases.

Case 1): when the type of the container read from the rest binary data (i.e., the data other than the binary data of the file type container in the returned binary data) is a metadata container, and the capacity of the rest binary data is less than the capacity of the metadata container, the difference between the capacity of the metadata container and the capacity of the rest binary data is calculated as a new capacity for the second request, the sum of the offset the capacity for the first request is taken as a new offset, on this basis, the second request for binary data is sent to the server.

Case 2): when the type of the container read from the rest binary data is a media data container, the sum of the capacity of the media data container and the capacity of the file type container is calculated as a new offset for the second request, and a set capacity (which may be an empirical value capable of covering the capacity of the metadata container) is taken, on this basis, the second request for binary data is sent to the server.

Taking an MP4 file as an example of the media file, the binary data requested by the player from the server according to the set offset and capacity does not contain the complete binary data of the moov box, and moreover, the player needs to read the type and capacity of the container from the binary data returned by the server to determine the offset and the capacity of the moov box in the MP4 file.

According to the binary data of the MP4 file, the starting byte always corresponds to the flyp box, the binary data of the fytp box is identified from the returned binary data, and the length of the fytp box can be known according to the header of the ftyp box, so that the binary data of the next box is read from the rest binary data according to the standard length of the header, including the following cases according to the container type represented by the header.

1) When the type of the container read from the rest binary data (i.e., the data other than the binary data of the fytp box in the returned binary data) is moov box, and the capacity of the rest binary data is not less than the capacity of the moov box, the moov data starting with the offset of the moov box in the MP4 file and conforming to the capacity of the moov box in the MP4 file is acquired from the server according to the determined offset and capacity.

2) When the type of the container read from the rest binary data is moov box, and the capacity of the rest binary data is less than the capacity of the moov box, the difference between the capacity of the moov box and the capacity of the rest binary data is calculated as a new capacity for a second request, and the sum of the offset and the capacity for the first request is taken as a new offset, on this basis, the second request for binary data is sent to the server.

3) When the type of the container read from the rest binary data is the mdat box, the sum of the capacity of the mdat box and the capacity of the flyp box is calculated as a new offset for a second request, and a set capacity is taken, on this basis, the second request for binary data is sent to the server.

Therefore, regardless of the packaging structure of the media file, namely, regardless of the packaging sequence of the file type container, the metadata container and the media data container in the media file, the metadata in the metadata container can be acquired from the server by the player at most two requests, and thus the metadata acquisition efficiency is improved.

As an example, for an MP4 file, a section, from zero bytes, of the binary data returned by the server corresponds to flyp box according to the packaging specification of the MP4 file, and the capacity (i.e., length) of the flyp box and the capacity of a complete MP4 file can be read from the header of the flyp box according to the packaging specification of the header of the box; given that the capacity of the flyp box is a (in bytes), the header information of the subsequent container is read starting from a+1 to acquire the type and capacity of the subsequent container, and if the flyp box is followed by the moov box acquired by reading, and the capacity of the rest binary data (the set capacity minus the capacity of the ftyp box) is larger than the capacity of the moov box, it's proven that the complete binary data of the moov box has been retrieved, and the metadata in the moov box can be extracted from the rest binary data according to the offset and the capacity of the moov box.

Step S202, the player analyzes the acquired moov to acquire media information used for describing the media data encapsulated in the mdat box of the media file.

Herein, the media information is used to position the offset and the capacity of the requested media data in the media file.

In some embodiments, the player parses a nested structure of sub-containers in the metadata container after acquiring the metadata packaged in the metadata container from the server, and reads binary data in each sub-container according to the nested structure of the sub-containers; and the player parses out the media information of the media data characterized by each sub-container from the read binary data. In practical application, the media information may include offset, capacity, decoding time and the like of video frames and/or audio frames in the media file.

Taking an MP4 file as an example of the media file, the metadata container is moov box, with reference to FIG. 2, it can be known that mvhd box and track box are packaged in the moov box, wherein information such as creation time, modification time, a time measurement scale, playable duration, default volume and the like of the MP4 file can be acquired by parsing binary data of the mvhd box; the moov box comprises a plurality of track boxes which record description information specific to each media track, for example, for a video track box, a plurality of sub-containers are nested in multiple layers in the video track box, video frame information and corresponding picture information of an MP4 file are acquired by parsing corresponding binary data on the basis of a nested structure of the video track box.

In one embodiment, the player can parse the acquired metadata to acquire media information by: sequentially parsing the binary data corresponding to the standard length of the header of the container in the binary data of the metadata container to acquire the container type of the sub-container in the metadata container and the length of the container data of the sub-container; calling a parser of a type corresponding to the container type of the sub-container, sequentially parsing binary data corresponding to the length of the container data in unparsed data to acquire media information represented by the container data.

With respect to the situation that a plurality of sub-containers are nested in the metadata container, the offset each time the player reads the binary data is the sum of the lengths of the sub-containers, and the lengths of the read binary data conform to the standard length of the container header, so that the type and the length of the currently processed sub-container can be parsed out.

For example, when reading for the first time, the player reads from zero bytes of the binary data of the metadata container, and the length of the read binary data conforms to the standard length of the container header, so that the type and the length of a first sub-container can be parsed out; when reading for the second time, the player starts reading the binary data starts by taking the length of the firstly read sub-container as an offset, and the length of the read binary data conforms to the standard length of the container header, so that the type and the length of the second sub-container can be parsed out.

According to the above method for reading the binary data, rollback due to redundant reads does not occur, and a second read due to inadequate reads does not occur, therefore, the efficiency and the accuracy are ensured.

In one embodiment, a typical container type nested in a metadata container is pre-labeled to indicate whether the container is directly used to package binary data or is further packaged with a container, for example, the mvhd box, audio track box, and video track box shown in FIG. 2 are labeled as further packaged with containers, and the stts box, stsd box and the like shown in FIG. 2 are labeled as directly packaging binary data.

For the container types labeled as directly packaging binary data, parsers corresponding to the container types one by one are set for parsing out the represented media information according to the binary data; the parsed out container type of a sub-container is compared with the pre-labeled container type, including the following two cases.

Case 1): when it is determined through comparison that the container type of the sub-container is pre-labeled and pre-labeled as directly packaging binary data, a parser corresponding to the container type of the sub-container is called, and the container data in the sub-container is parsed by the parser to acquire media information represented by the container data.

Case 2): when it is determined through comparison that the container type of the sub-container is pre-labeled and pre-labeled as further packaged with a container, recursively parsing the binary data corresponding to the sub-container according to the standard length of the container header in the media file until a container, packaged in the sub-container, having the container type pre-labeled and pre-labeled as directly packaging binary data is parsed out, a parser corresponding to the container type of the container packaged in the sub-container is called to parse binary data byte by byte, wherein the length of the parsed binary data corresponds to the length of the container data of the container packaged in the sub-container, so as to acquire media information represented by the container data of the container packaged in the sub-container.

In one embodiment, a method of recording media information in parsing a metadata container is described, when the container type of a sub-container in the metadata container is acquired by sequentially parsing binary data corresponding to a standard length of a container header in binary data of a metadata container, an object is established according to a nested relationship between the sub-container and the container to which the sub-container belongs and a nested relationship between the sub-container and the packaged container; when the container type of a sub-container is pre-labeled as directly packaging binary data, an array including media information is stored in the object created corresponding to the sub-container, the stored media information being represented by the container data of the sub-container.

For example, in FIG. 2, when the type of the parsed sub-container is stts box, since the stts box is pre-labeled as directly packaging binary data, an array including media information, which is duration information represented by the container data of the stts box, is stored in an object established corresponding to the stts box.

In one embodiment, the method of recording the nested relationship between sub-containers during parsing a metadata container is described, when binary data corresponding to a standard length of a container header in metadata container binary data is sequentially parsed to acquire the container type of a sub-container in the metadata container, if the container type is pre-labeled as directly packaging binary data, the parsed sub-container is recorded in the called parser; an example of the recorded sub-container is set among attributes of the sub-container, and the attributes include a container to which the sub-container belongs, for describing a nested relationship between the sub-container and the container to which the sub-container belongs.

For example, in FIG. 2, when the type of the parsed sub-container is stsd box, since the stsd box is pre-labeled as directly packaging binary data, the stsd box is recorded in the parser corresponding to the stsd box, the instance of the stsd box is set among attributes of the stbl box sub-container, and so on, and finally the stsd box, the stts box and, the stsc box and other sub-containers nested in the stbl box are recorded in the sub-container attributes of the stsd box.

In some embodiments, when it is determined through comparison that the container type of the sub-container is not pre-labeled, or is pre-labeled as directly packaging binary data but without calling a parser of a corresponding type, the binary data corresponding to the parsing sub-container is ignored, and according to the length of the sub-container, the parsing process jumps to the part corresponding to the next sub-container in the binary data to continue parsing.

In fact, a user-defined container type appears in a media file, the overall parsing progress of a metadata container is not affected regardless of jumping, moreover, when the container type of the metadata container changes, compatible parsing of the latest metadata container can be quickly done by adding, deleting and modifying a parser of a corresponding type by setting the parser, and which shows flexibility and rapidness in upgrading.

In some embodiments, when the complete media information is not identified from the metadata requested from the server according to the set offset and capacity, the offset and the capacity of the metadata box are calculated according to the header of the metadata box; and the metadata in the media file is requested from the server, wherein the requested metadata starts from the offset in the multimedia file and conforms to the capacity.

Step S102, a fragmented media file including media data is constructed by the player.

In some embodiments, the player computes fragmented media file level metadata based on the acquired media data in the media file and the metadata in the media file. And the acquired media data in the media file and the fragmented media file level metadata are packaged into a fragmented media file container to acquire a fragmented media file.

In some embodiments, data representing the type and compatibility of a fragmented media file is filled into the file type container of the fragmented media file. For example, taking the FMP4 file packaged to form the packaging structure shown in FIG. 4 as an example, the type and length of the container (representing the overall length of the flyp box) are filled in the file type container of the FMP4 file, i.e., the header of the flyp box, and data (binary data) representing the file type as FMP4 and a compatible protocol are generated after being filled in the data part of the flyp box.

Metadata representing the file level of the fragmented media file are filled into the metadata container of the fragmented media file.

In one embodiment, the metadata describing the media data required to fill the nested structure are computed based on the media data to be filled into the packaged structure of the fragmented media file and the nested structure of the metadata container in the fragmented media file.

Still taking FIG. 4 as an example, the metadata representing the file level of the FMP4 file are computed and filled into a metadata container (i.e., moov box) of the FMP4, in which three containers mvhd, track, and video extension (mvex, movie extend) are nested.

The metadata packaged in the mvhd container is used for representing media information related to the playing of the fragmented media file, which includes position, duration, creation time, modification time and the like; the sub-containers nested in the track container represent references and descriptions of corresponding tracks in the media data, for example, a container (denoted as tkhd box) describing characteristics and general information (such as duration, width) of a track and a container (denoted as mdia box) recording media information (such as media type and sampled information) of a track are nested in the track container.

In one embodiment, one or more fragments may be packaged in a fragmented media file and, for media data to be filled, may be filled into one or more fragmented media data containers (i.e., mdat box) of the fragmented media file, each fragment having packaged therein a fragment level metadata container (denoted as a moof box), wherein the filled metadata is used to describe the media data filled in the fragment, allowing the fragments to be decoded independently.

64 In combination with FIG. 4, filling the media data to be filled into two fragments of the packaging structure of the FMP4 file is taken as an example of filling the media data into each fragment; the metadata that needs to be filled into the fragment level metadata container (i.e., moof box) of the corresponding fragment is computed and correspondingly filled into the sub-container nested in the moof box, wherein the sub-container in the header of the moof box is called the moof box, in which the binary data is used for indicating the type of the container as "moof box" and the length of the moof box.

In one embodiment of filling the above data into corresponding containers, when a filling operation is performed, writing function of a class is called to complete writing and merging of binary data in a memory buffer of the sub-container, and an instance of the class is returned for merging the sub-container with a sub-container having a nested relationship thereto.

As an example of filling data, a class MP4 for realizing an packaging function is created, and each sub-container in a fragmented media file is packaged into a static method of a class Stream; a class Stream for realizing a binary data operation function is created, wherein each class stream is provided with a memory buffer area for storing binary data to be filled; multi-byte decimal data to be filled are converted into binary data through a static method provided by Stream; combining and filling binary data to be filled into a sub-container in a memory buffer area are completed through a writing function provided by an instance of the class Stream; the static method provided by Stream returns a new Stream instance to merge the current sub-container with other sub-containers with nested relationships thereto.

Step S103, the fragmented media file is sent to the media resource expansion interface through a player, and the media element of the webpage is invoked by the media resource expansion interface for playing.

Figure 10:
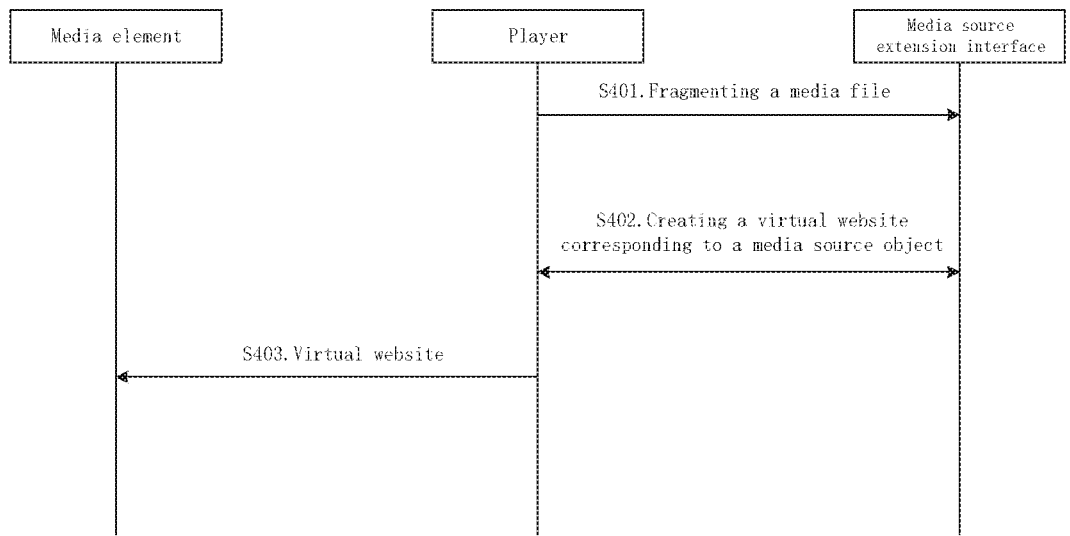
FIG. 10 is a schematic view of a procedure of sending a fragmented media file to a media element of a webpage over a media source extension interface of the webpage by a player for decoding and playing provided by an embodiment of the disclosure.

In some embodiments, with reference to FIG. 10, which is a flow diagram of a player sending the fragmented media file to the media element of a web page for decoding and playing through a media source expansion interface of the web page according to an embodiment of the present disclosure, description will be provided in conjunction with the steps shown in FIG. 10.

Step S401, the player adds the fragmented media file to the media source object in the media resource expansion interface.

Figure 11:
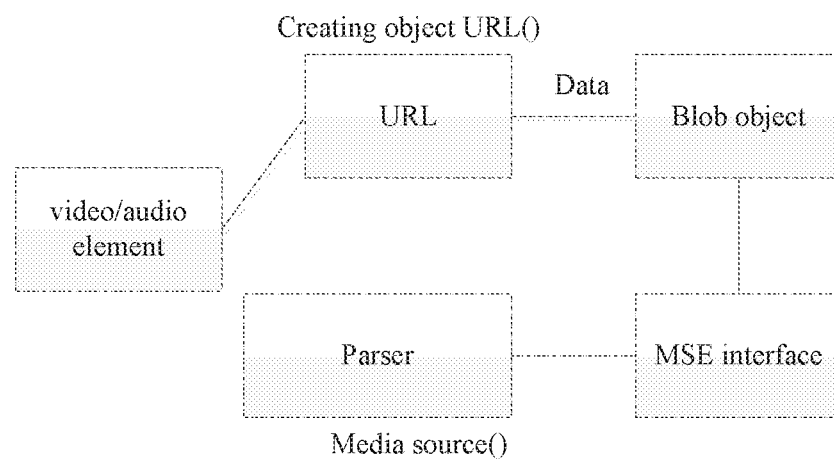
FIG. 11 is an optional schematic view of playing a fragmented media file over a media source extension interface of a webpage by a player provided by an embodiment of the disclosure.

With reference to FIG. 11, which an optional schematic diagram of a player playing a fragmented media file through a media source expansion interface of a web page provided by an embodiment of the present disclosure; when the player receives a playing event of the media file in a playing window in the web page (corresponding to the playing window of the player), the player creates a media source object by executing a MediaSource method, creates a cache of the MediaSource object, namely a SourceBuffer object, by executing an addSourceBuffer method packaged in a media source expansion interface, wherein one MediaSource object has one or more SourceBuffer objects, and each SourceBuffer object can correspond to a playing window in the web page and is used for receiving a fragmented media file to be played in the window.

In the playing process of the media file, a parser (Parser) in the player continuously constructs a new fragmented media file by parsing newly acquired media data, and adds the fragmented media file to the SourceBuffer object of the same SourceBuffer object by executing an appendBuffer method of the SourceBuffer object.

Step S402, the player invokes the media resource expansion interface to create a virtual website corresponding to the media source object.

For example, the player executes a createObjectURL method packaged in the media source extension interface, creates a virtual address corresponding to the media source object, i.e., a virtual URL, in which a fragmented media file of the Blob type is packaged.

In addition, the player sets the MediaSource object as the source (src) attribute of the virtual URL, that is, binds the virtual URL to a media element in the web page, such as a video/audio element, this process is also referred to as associating the media source object to the media element in the web page.

Step S403, the player delivers the virtual website to the media element of the webpage, and the virtual website is used for the media element to play a video by taking the media source object as a data source.

For example, the player includes a statement for calling the media element to play a virtual URL, for example: <audio> virtual URL. When the browser interprets the corresponding statement in the player embedded in the web page, the media element of the browser is enabled to read the fragmented media file from the SourceBuffer object bound with the virtual URL, and the fragmented media file is decoded and played.

The process of converting the MP4 file into the FMP4 file by the player and playing the FMP4 file on the web page through the media source extension interface will be described below.

Figure 12:
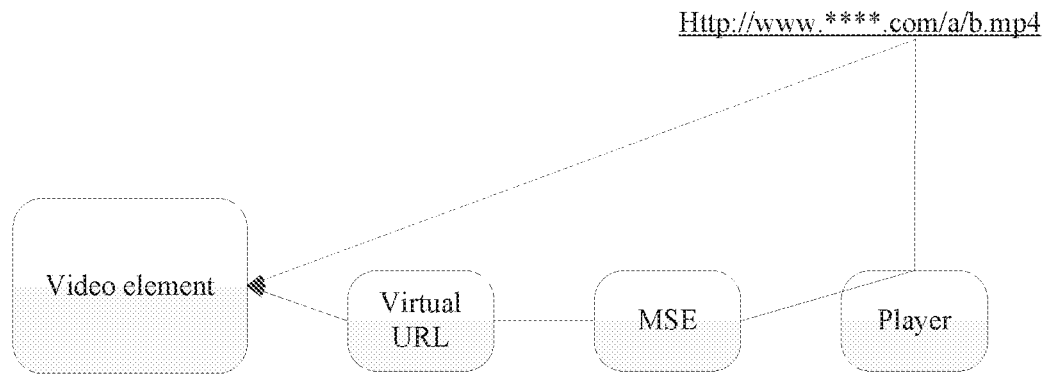
FIG. 12 is a schematic view of converting an MP4 file to an FMP4 file which is played by a media source extension interface.

With reference to FIG. 12, which is a schematic diagram of an MP4 file converted to an FMP4 file and played through a media source expansion interface provided by an embodiment of the present disclosure, a player requests, on the basis of a real address (http://www.touitao.com/a/b.mp4), to acquire part of the media data in the MP4 file from the server, e.g., data having decoding time within the given time period in succession with a play point.

The player constructs an FMP4 file based on the acquired media data, and then adds the FMP4 file to the SourceBuffer object corresponding to the MediaSource object. As the virtual URL is bound to the MediaSource object, when the codes allowing the player to call the audio/video element are executed, the audio/video element reads the continuously added new FMP4 file from the SourceBuffer object of the MediaSource object and decodes to realize continuous playing of the media file.

80 In an embodiment of the present disclosure, the fragmented media file added to the media source object is currently played fragmented media file. For example, currently the fragmented media file 1 is playing, subsequent fragmented media files 2, 3 have been constructed, and then the constructed fragmented media files 2, 3 will be added to the Source Buffer of the MSE for preloading, and accordingly, the first key frame of the two key frames corresponding to the media data acquired by the player is the first key frame occurring after the fragmented media file 1.

For a virtual address transmitted by a player to a media element of a web page, the player comprises a statement for calling the media element to play a virtual URL, for example: <audio> virtual URL. When the web page interprets the corresponding statement in the player embedded in the web page, the media element of the web page is enabled to read the fragmented media file from the SourceBuffer object bound with the virtual URL, and the fragmented media file is decoded and played.

The process of converting the MP4 file into the FMP4 file by the player and playing the FMP4 file on the web page through the media source extension interface will be described below.

In the embodiment of the disclosure, the media element of the web page acquires the media source object on the basis of the virtual URL so as to play the media file instead of acquiring the media data on the basis of the real address of the media file, thereby realizing the protection of the real address of the media file.

Figure 13:
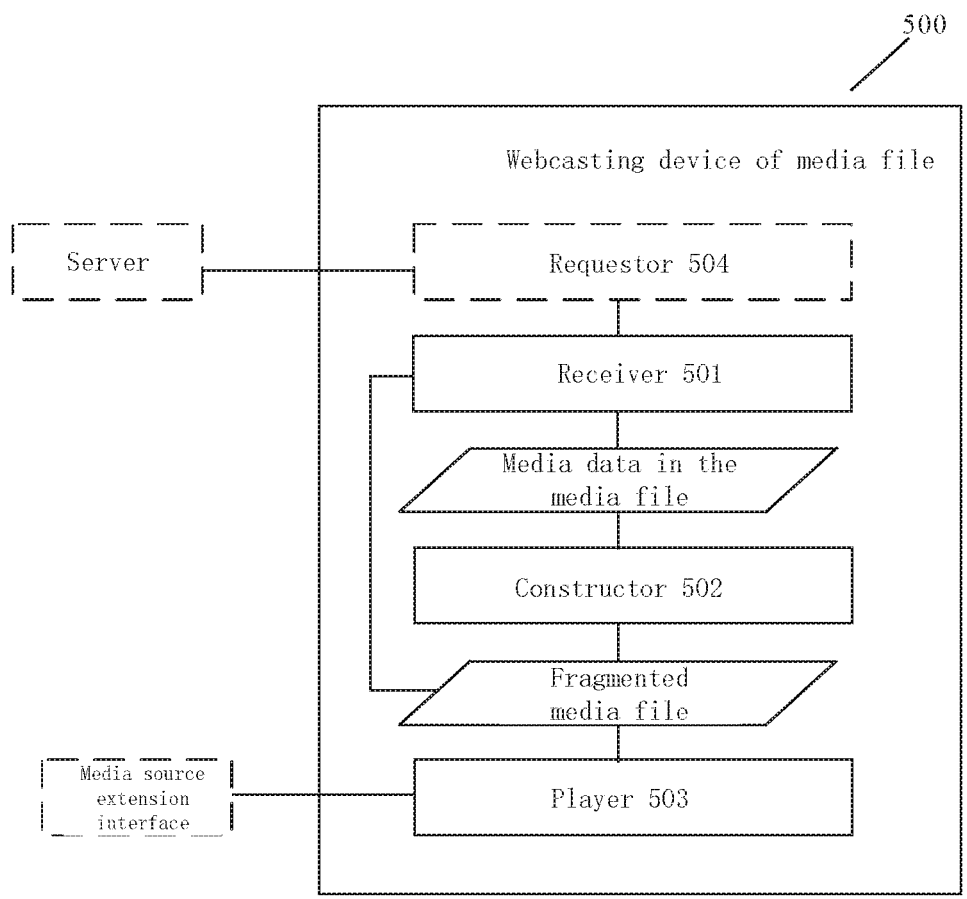
FIG. 13 is an optional structural schematic view of a webcasting device of a media file in an embodiment of the disclosure.

The network playing device of the media file is described below. As an example of a hardware implementation or a software implementation of the network playing device of the media file, the network playing device of the media file may be provided as a series of modules having coupled at the signal/information/data level, as will be described below with reference to FIG. 13, which is a diagram of optional components of the network playing device of the media file of the disclosed embodiment, a series of units included in the network playing device of the media file are shown, but the unit structure of the network playing device of the media file is not limited thereto, for example, the units therein may be further divided or combined according to different functions implemented. With reference to FIG. 13, a network playing device 500 of a media file includes an obtainer 501 disposed to obtain media data in a media file from a server, a constructor 502 disposed to construct fragmented media files containing the media data by the player, and a player 503 disposed to send the fragmented media files to a media source extension interface by the player and invoke a media element of the webpage by the media source extension interface for playing.

The player plays the media file in the webpage, and the media file adopts a non-streaming media encapsulation format.

In some embodiments, the constructor 502 is disposed to calculate moov on a level of the fragmented media files according to the media data in the obtained media file and moov in the media file.

The media data in the obtained media file and the moov on the level of the fragmented media files in a fragmented media file box are encapsulated to obtain the fragmented media files.

In some embodiments, the obtainer 501 is disposed to determine two key frames in the media file following a real-time playing point based on media information identified from the media file.

A network request is sent to the server. The network request is used for requesting to obtain media data between the two key frames in the media file.

The media data between the two key frames returned from the server are received.

In some embodiments, the obtainer 501 is further disposed to determine an offset and a size of a video frame between the two key frames in the media file, and an offset and a size of an audio frame aligned with the video frame in the media file according to media information identified from the media file.

According to the offset and the size, an offset and a size of a target range used for carrying the network request are determined to request the video frame and the audio frame contained in the target range from the server.

In some embodiments, the device further includes a requestor 504 disposed to request moov in the media file from the server based on the given offset and size. The requested moov starts from the offset in the media file and is corresponding to the size.

Media information in the moov returned from the server is identified.

The media information is configured for determining the offset and the size of the requested media data in the media file.

In some embodiments, the obtainer 501 is further disposed to calculate an offset and a size of the moov box according to a header of a moov box when intact media information is failed to be identified from the moov requested from the server by the given offset and size.

The moov in the media file from the server is requested; the requested moov starts from the offset in the media file, and is corresponding to the size.

Corresponding media information is obtained by identifying the obtained moov.

In some embodiments, the media source extension interface adds the received fragmented media files to a media source object in the media source extension interface.

A virtual website of the media source object is created.

The virtual website is transmitted to a media element of a browser; the virtual website is configured for playing the media source object as a data source by the media element.

In summary, application of the above embodiments of the present renders the following beneficial effects:

1. Media files in a non-streaming media packaging format are converted into fragmented media files by a front-end player, storage services and CDNs deployment are no more necessary, the real-time cost of playing the media files in the non-streaming media packaging format and the load of a network system architecture are reduced.

2. When a given time period of the media file is to be played, it's only required to extract the media data at the given time period from the media file in a non-streaming media format to package into an independently decodable fragmented media file; as such, on one hand, the limitation that the non-streaming media packaged format file can only be independently played after being completely downloaded is overcome with better real-time performance achieved; on the other hand, since it's only required to construct the fragmented media file only for the given period of time, rather than convert the complete media file into the streaming media format in advance, the conversion delay is small, so that the pre-storage is no more necessary, no extra storage space is occupied except by the original media file, and thus the occupation of the storage space is remarkably reduced.

3. By converting media data in a media file in a non-streaming media format into a fragmented media file and sending the fragmented media file to a media element of a web page for decoding and playing through a media source expansion interface of the web page, the object of playing the media file in the non-streaming media format through the web page by the embedded player is achieved, overcoming the limitation that the non-streaming media packaged format file can only be independently played after being completely downloaded.

4. The player acquires part of the media data between the key frames of the media file, and thus realizes the control of the loading of the media data in the process of playing the media file.

5. The packaged fragmented media file is on the basis of partial media data of the acquired media file instead of all the data of the media file, so that the conversion delay is minimized, pre-storage is no more necessary, extra storage space is not occupied except by the original media file, and thus the occupation of the storage space is remarkably reduced, a black screen or video buffering and lag is avoided when a user switches the resolution in the watching process, and the real-time performance of the resolution switching is improved.

6. The media element of the web page acquires the fragmented media file on the basis of the virtual address to decode and play, instead of acquiring the media data on the basis of the real address of the media file to play, thereby realizing the protection of the real address of the MP4 file.

The aforementioned contents merely are concrete embodiments of the disclosure, but the protective scope of the disclosure is not restricted to the embodiments. Any modification or substitution within the technical scope disclosed by the disclosure that can easily be associated by a person skilled in the art should be included in the protective scope of the disclosure. Therefore, the protective scope of the disclosure should refer to those of the claims.

What is claimed is:

1. A webcasting method of a media file, comprising:
   obtaining media data in the media file from a server by a player built-in a webpage;
   wherein the player plays the media file in the webpage, and the media file adopts a non-streaming media encapsulation format;
   constructing fragmented media files comprising the media data by the player;
   sending the fragmented media files to a media source extension interface by the player, and invoking a media element of the webpage by the media source extension interface for playing;
   wherein the method further comprises:
   when intact media information is failed to be identified from moov requested from the server by a given offset and size, calculating an offset and a size of a moov box according to a header of the moov box;
   obtaining moov in the media file from the server, wherein the obtained moov starts from the offset in the media file and is corresponding to the size; and
   obtaining corresponding media information by identifying the obtained moov.

2. The method according to claim 1, wherein the process of constructing fragmented media files comprising the media data by the player comprises:
   according to the media data in the obtained media file and moov in the media file, calculating moov on a level of the fragmented media files; and
   encapsulating the media data in the obtained media file and the moov on the level of the fragmented media files in a fragmented media file box to obtain the fragmented media files.

3. The method according to claim 1, wherein the process of obtaining media data in the media file from a server comprises:
   based on media information identified from the media file, determining two key frames in the media file following a real-time playing point;

sending a network request to the server; wherein the network request is used for requesting to obtain media data between the two key frames in the media file; and
receiving the media data between the two key frames returned from the server.

4. The method according to claim 3, wherein the method further comprises:
according to media information identified from the media file, determining an offset and a size of a video frame between the two key frames in the media file, and an offset and a size of an audio frame aligned with the video frame in the media file; and
according to the offset and the size, determining an offset and a size of a target range used for carrying the network request to request the video frame and the audio frame comprised in the target range from the server.

5. The method according to claim 1, wherein the method further comprises:
before media data m the media file are obtained from the server, based on the given offset and size, requesting moov in the media file from the server; wherein the requested moov starts from the offset in the media file and is corresponding to the size; and
identifying media information in the moov returned from the server;
wherein the media information is configured for determining the offset and the size of the requested media data in the media file.

6. The method according to claim 1, wherein the process of invoking a media element of the webpage by the media source extension interface for playing comprises:
adding the received fragmented media files to a media source object in the media source extension interface by the media source extension interface;
creating a virtual website of the media source object; and
transmitting the virtual website to a media element of a browser; wherein the virtual website is configured for playing the media source object as a data source by the media element.

7. A webcasting device of a media file, disposed in a player built-in a webpage, comprising:
at least one processor; and
at least one memory communicatively coupled to the at least one processor and storing instructions that upon execution by the at least one processor cause the webcasting device to:
obtain media data in a media file from a server;
wherein the player plays the media file in the webpage, and the media file adopts a non-streaming media encapsulation format;
construct fragmented media files comprising the media data by the player;
send the fragmented media files to a media source extension interface by the player, and invoke a media element of the webpage by the media source extension interface for playing;
calculate an offset and a size of a moov box according to a header of the moov box when intact media information is failed to be identified from moov requested from the server by a given offset and size;
obtain moov in the media file from the server, wherein the obtained moov starts from the offset in the media file and is corresponding to the size; and
obtain corresponding media information by identifying the obtained moov.

8. The device according to claim 7, wherein the at least one memory further stores instructions that upon execution by the at least one processor cause the device to:
calculate moov on a level of the fragmented media files according to the media data in the obtained media file and moov in the media file;
encapsulate the media data in the obtained media file and the moov on the level of the fragmented media files in a fragmented media file box to obtain the fragmented media files.

9. The device according to claim 7, wherein the at least one memory further stores instructions that upon execution by the at least one processor cause the device to:
determine two key frames in the media file following a real-time playing point based on media information identified from the media file;
send a network request to the server; wherein the network request is used for requesting to obtain media data between the two key frames in the media file; and
receive the media data between the two key frames returned from the server.

10. The device according to claim 9, wherein the at least one memory further stores instructions that upon execution by the at least one processor cause the device to:
determine an offset and a size of a video frame between the two key frames in the media file, and an offset and a size of an audio frame aligned with the video frame in the media file according to media information identified from the media file;
according to the offset and the size, determine an offset and a size of a target range used for carrying the network request to request the video frame and the audio frame comprised in the target range from the server.

11. The device according to claim 7, wherein the at least one memory further stores instructions that upon execution by the at least one processor cause the device to:
request moov in the media file from the server based on the given offset and size; wherein the requested moov starts from the offset in the media file and is corresponding to the size;
identify media information in the moov returned from the server;
wherein the media information is configured for determining the offset and the size of the requested media data in the media file.

12. The device according to claim 7, wherein the media source extension interface adds the received fragmented media files to a media source object in the media source extension interface;
creating a virtual website of the media source object; and
transmitting the virtual website to a media element of a browser; wherein the virtual website is configured for playing the media source object as a data source by the media element.

13. A non-transitory computer-readable storage medium, storing an executable instruction, disposed to perform operations when the executable instruction is executed by a computing device, the operations comprising:
obtaining media data in the media file from a server by a player built-in a webpage;
wherein the player plays the media file in the webpage, and the media file adopts a non-streaming media encapsulation format;
constructing fragmented media files comprising the media data by the player;

sending the fragmented media files to a media source extension interface by the player, and invoking a media element of the webpage by the media source extension interface for playing;

when intact media information is failed to be identified from moov requested from the server by a given offset and size, calculating an offset and a size of a moov box according to a header of the moov box;

obtaining moov in the media file from the server; wherein the obtained moov starts from the offset in the media file and is corresponding to the size; and obtaining corresponding media information by identifying the obtained moov.

14. The non-transitory computer-readable storage medium according to claim 13, wherein the operations further comprise:

according to the media data in the obtained media file and moov in the media file, calculating moov on a level of the fragmented media files; and encapsulating the media data in the obtained media file and the moov on the level of the fragmented media files in a fragmented media file box to obtain the fragmented media files.

15. The non-transitory computer-readable storage medium according to claim 13, wherein the operations further comprise:

based on media information identified from the media file, determining two key frames in the media file following a real-time playing point;

sending a network request to the server; wherein the network request is used for requesting to obtain media data between the two key frames in the media file; and receiving the media data between the two key frames returned from the server.

16. The non-transitory computer-readable storage medium according to claim 15, wherein the operations further comprise:

according to media information identified from the media file, determining an offset and a size of a video frame between the two key frames in the media file, and an offset and a size of an audio frame aligned with the video frame in the media file; and according to the offset and the size, determining an offset and a size of a target range used for carrying the network request to request the video frame and the audio frame comprised in the target range from the server.

17. The non-transitory computer-readable storage medium according to claim 13, wherein the operations further comprise:

before media data in the media file are obtained from the server, based on the given offset and size, requesting moov in the media file from the server; wherein the requested moov starts from the offset in the media file and is corresponding to the size; and identifying media information in the moov returned from the server;

wherein the media information is configured for determining the offset and the size of the requested media data in the media file.

* * * * *